United States Patent
Sartoni et al.

(10) Patent No.: US 10,125,736 B2
(45) Date of Patent: Nov. 13, 2018

(54) METHOD FOR DETECTING THE ANTI-KNOCKING CAPACITY OF A FUEL IN AN INTERNAL COMBUSTION ENGINE

(71) Applicant: Ferrari S.p.A., Modena (IT)

(72) Inventors: Giovanni Sartoni, Ozzano dell'Emilia (IT); Simone Paolin, Pianoro (IT); Luca Poggio, Casalecchio di Reno (IT); Francesco Marcigliano, Maranello (IT)

(73) Assignee: Ferrari S.p.A., Modena (IT)

( * ) Notice: Subject to any disclaimer, the term of this patent is extended or adjusted under 35 U.S.C. 154(b) by 135 days.

(21) Appl. No.: 15/254,398

(22) Filed: Sep. 1, 2016

(65) Prior Publication Data

US 2017/0089316 A1 Mar. 30, 2017

(30) Foreign Application Priority Data

Sep. 3, 2015 (IT) .................... 102015000048441

(51) Int. Cl.
| | |
|---|---|
| *F02D 19/08* | (2006.01) |
| *F02P 5/152* | (2006.01) |
| *F02D 41/24* | (2006.01) |
| *F02D 41/00* | (2006.01) |
| *G01L 23/22* | (2006.01) |

(Continued)

(52) U.S. Cl.
CPC .......... *F02P 5/152* (2013.01); *F02D 19/0636* (2013.01); *F02D 41/0025* (2013.01); *F02D 41/1498* (2013.01); *F02D 41/2403* (2013.01); *F02P 5/1527* (2013.01); *G01L 23/221* (2013.01); *G01M 15/08* (2013.01); *F02D 35/027* (2013.01); *F02D 41/2422* (2013.01); *F02D 41/2477* (2013.01); *F02D 2200/0612* (2013.01); *F02P 17/00* (2013.01); *Y02T 10/36* (2013.01); *Y02T 10/46* (2013.01)

(58) Field of Classification Search
CPC .... F02B 1/12; F02D 41/3035; F02D 41/1498; Y02T 10/36; F02P 5/152; G01M 15/08
See application file for complete search history.

(56) References Cited

U.S. PATENT DOCUMENTS

| | | | | |
|---|---|---|---|---|
| 4,376,429 A | * | 3/1983 | Youngblood | ......... F02P 5/1522 123/406.21 |
| 4,708,113 A | | 11/1987 | Harada et al. | |

(Continued)

FOREIGN PATENT DOCUMENTS

JP          9-158819 A      6/1997

*Primary Examiner* — Hai Huynh
*Assistant Examiner* — Gonzalo Laguarda
(74) *Attorney, Agent, or Firm* — Blank Rome LLP

(57) ABSTRACT

A method for detecting the anti-knocking capacity of a fuel in an internal combustion engine, which comprises the step of analyzing the single combustion cycles of the cylinders to be repeated until a counter reaches a respective threshold value; the step of calculating the mean spark advance operated by the internal combustion engine in the single combustion cycles of the cylinders that have allowed said counter to reach the respective threshold value; and the step of determining the anti-knocking capacity of the fuel as a function of the first counter that has reached the respective threshold value and as a function of the mean spark advance operated by the internal combustion engine in the single combustion cycles of the cylinders that have allowed said counter to reach the respective threshold value.

8 Claims, 5 Drawing Sheets

(51) Int. Cl.
  *F02D 41/14* (2006.01)
  *G01M 15/08* (2006.01)
  *F02D 19/06* (2006.01)
  F02D 35/02 (2006.01)
  F02P 17/00 (2006.01)

(56) References Cited

U.S. PATENT DOCUMENTS

| | | | |
|---|---|---|---|
| 4,711,212 | A | 12/1987 | Haraguchi et al. |
| 4,716,873 | A | 1/1988 | Takaba et al. |
| 5,040,510 | A | 8/1991 | Krebs et al. |
| 5,131,369 | A | 7/1992 | Kanehiro et al. |
| 6,283,093 | B1 | 9/2001 | Lautenschuetz et al. |
| 6,947,830 | B1 * | 9/2005 | Froloff ................ F02D 35/023 701/111 |
| 7,757,659 | B2 * | 7/2010 | Kurotani ............. F02D 19/0694 123/295 |
| 8,347,857 | B2 * | 1/2013 | Cleary ................ F02D 13/0207 123/347 |

* cited by examiner

METHOD FOR DETECTING THE ANTI-KNOCKING CAPACITY OF A FUEL IN AN INTERNAL COMBUSTION ENGINE

TECHNICAL FIELD

The present invention relates to a method for detecting the anti-knocking capacity of a fuel in an internal combustion engine.

PRIOR ART

An internal combustion engine with a controlled ignition comprises a number of cylinders, each provided with a piston, which cyclically slides inside the cylinder, and with a spark plug, which is cyclically controlled by an electronic control unit so as to generate a spark between its electrodes, thus determining the ignition of the gases compressed inside the cylinder. The electronic control unit comprises a memory, where a series of maps are stored, which provide values for controlling the spark plugs based on the current engine point; in particular, for each spark plug, the maps provide the value of the spark advance, i.e. the value of the angular interval elapsing between the ignition, namely the generation of the spark between the electrodes of the spark plug, and the top dead centre o TDC of the piston; if the value of the spark advance is zero, then the ignition, namely the generation of the spark between the electrodes of the spark plug, takes place in the exact top dead centre o TDC of the piston.

The spark advance values stored in the maps contained in the electronic control unit are determined during an engine set up phase, so as to try and ensure a good combustion in all the possible operating conditions of the engine, thus enabling a good thermal efficiency thereof, preserving at the same time the integrity of the engine itself, which means avoiding the presence of excessive detonation phenomena inside the cylinders. Detonation is an explosive combustion of part of the air-fuel mixture, which takes place before the latter is reached by the flame front generated by the spark plug; after the detonation, a series of pressure waves are created, which go through the combustion chamber, thus violently hitting the metal walls. Detonation takes place when inside the chamber critical temperature and pressure values (which can significantly change from engine to engine) are exceeded and, when this happens at medium-low speeds, it causes a typical metal noise, which can clearly be perceived and is known as "knocking".

The occurrence of detonation phenomena is influenced by many factors, some of the most important ones are the fuel features and, in particular, the fuel anti-knocking capacity.

According to FIG. 1, a fuel with a small anti-knocking capacity (indicated with $RON_{91}$) is characterized by a remarkable nonlinearity in the occurrence of detonation phenomena as the operated spark advance changes (especially if we compare it with fuels having a greater anti-knocking capacity, indicated with $RON_{95}$ and $RON_{98}$).

In case detonation phenomena are recognized and the fuel being used has a small anti-knocking capacity (indicated with $RON_{91}$), the electronic control unit is designed to adjust (in particular, reduce) the value of the operated spark advance to the anti-knocking capacity of the fuel, so as to avoid the occurrence of further detonation phenomena in the cylinders. However, the electronic control unit is designed so to as to readjust (namely, restore) the operated spark advance as soon as said detonation phenomena in the cylinders end. Though, due to the remarkable nonlinearity of the fuel with a small anti-knocking capacity as the operated spark advance changes, new and more destructive detonation phenomena will immediately be generated again.

For this reason, the anti-knocking capacity of the fuel introduced into the tank after any refueling should always be detected very carefully, so that the electronic control unit can—every time—adjust the value of the operated spark advance to the anti-knocking capacity of the fuel, thus eliminating (or at least reducing) the occurrence of detonation phenomena in the cylinders.

SUMMARY OF THE INVENTION

An object of the invention is to provide a method for detecting the anti-knocking capacity of a fuel in an internal combustion engine, said method being free from the drawbacks described above and, in particular, easy and cheap to be implemented.

According to the invention, there is provided a method for detecting the anti-knocking capacity of a fuel in an internal combustion engine according to the appended claims.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
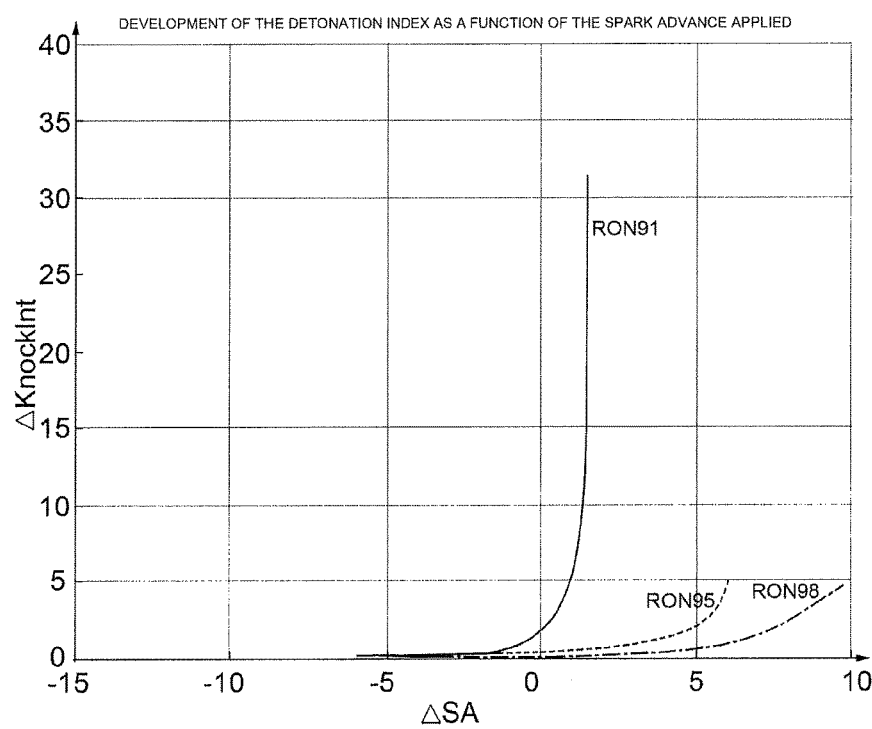
FIG. 1 graphically shows the occurrence of detonation phenomena as the spark advance operated for three different fuels changes.
Figure 2:
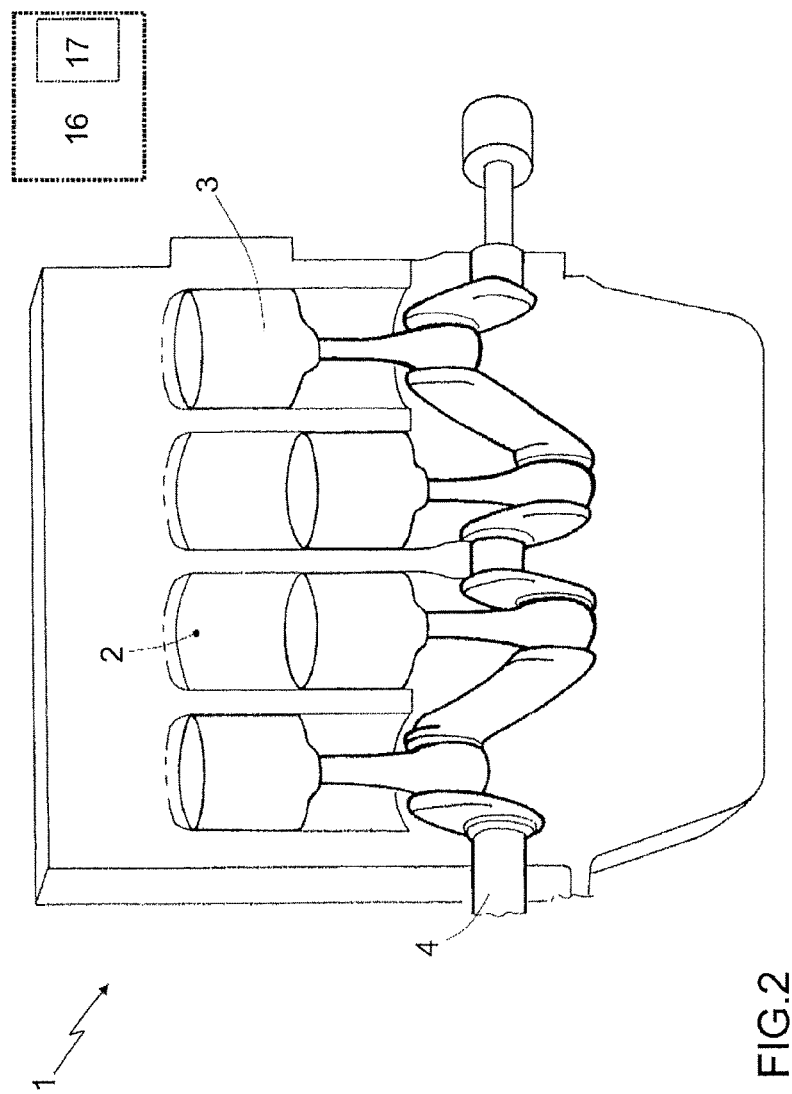
FIG. 2 is a schematic view of an internal combustion engine provided with a control unit implementing the method for detecting the anti-knocking capacity of a fuel according to the invention.

In FIG. 2, numeral 1 indicates, as a whole, an internal combustion engine with a controlled ignition comprising four cylinders 2 arranged in line. Each cylinder 2 houses a respective piston 3, which is mechanically connected, by means of a connecting rod, to a drive shaft 4, so as to transmit to the drive shaft 4 itself the force generated by the combustion inside the cylinder 2.

Figure 3:
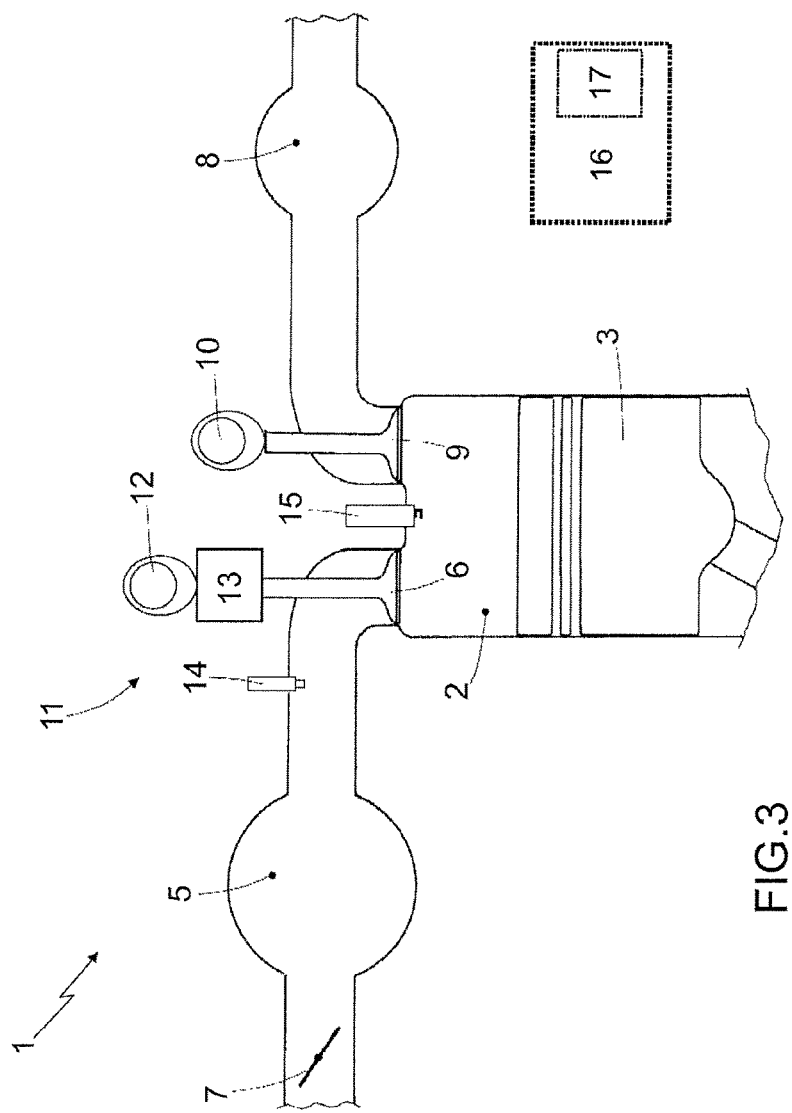
FIG. 3 is a schematic view of a cylinder of the internal combustion engine of FIG. 1.

According to FIG. 2, the internal combustion engine 1 comprises an intake manifold 5, which is connected to each cylinder 2 by means of two intake valves 6 (only one of them is shown in FIG. 3) and receives fresh air (i.e. air coming from the outside) through a throttle vale 7, which is movable between a closing position and a maximum opening position. Furthermore, the internal combustion engine 1 comprises an exhaust manifold 8, which is connected to each cylinder 2 by means of two exhaust valves 9 (only one of them is shown in FIG. 3) and leads into an emission pipe (not shown) to release the gases produced by the combustion into the atmosphere.

The position of the intake valves 6 is controlled by a valve opening control device 11, which controls the intake valves 6, managing their opening angle (with a fixed lift) so as to control the torque delivered by means of the intake valves 6. The valve opening control device 11 uses a traditional camshaft 12 receiving the motion of the drive shaft 4 and, for each intake valve 6, comprises a hydraulic actuator 13, which is electrically controlled (i.e. controlled by means of a solenoid valve) and is interposed between a stem of the intake valve 6 and the camshaft 12.

The position of each exhaust valve 9 is controlled by a valve opening control device (similar to the valve opening control device 11 and not shown), which controls the exhaust valves 9, managing their opening angle (with a fixed lift). The valve opening control device uses a camshaft 10 receiving the motion of the drive shaft 4 and, for each exhaust valve 9, comprises an electrically controlled actuator (not shown).

For each cylinder 2 there is provided a corresponding injector 14; according to the embodiment shown in FIG. 3, the injection is an indirect injection and, therefore, each injector 14 is arranged upstream of the cylinder 2 in an intake pipe connecting the intake manifold 5 to the cylinder 2. According to an alternative embodiment, which is not shown herein, the injection is a direct injection and, therefore, each injector 14 is partially arranged inside the cylinder 2.

Furthermore, each cylinder 2 comprises a spark plug 15, which is arranged through the crown end of the cylinder 2 in a central position between the intake valves 5 and the exhaust valves 9 and is cyclically activated so as to determine the ignition of the gases compressed inside the cylinder 2 at the end of each compression phase.

The engine 1 comprises a control unit 16, which manages the operation of combustion engine 1 and, among other things, controls the spark plugs 15 so as to determine the ignition of the gases compressed inside each cylinder 2. The control unit 16 comprises a memory 17, where a series of maps are stored, which provide values for controlling the spark plugs 15 based on the current engine point; in particular, for each spark plug 15 (namely, for each cylinder 2), the maps stored in the memory 17 provide a standard spark advance. Below you can find a description of the strategy implemented by the control unit 16 to estimate the anti-knocking capacity of the fuel being used and to adjust the spark advance operated in the internal combustion engine 1 to the anti-knocking capacity of the fuel being used.

The detonation control mode implemented by the control unit 16 involves providing an indication of the intensity of the detonation phenomenon in the internal combustion engine 1 through a proper treatment of a signal coming from one or more detonation sensors connected to the control unit 16. According to a preferred variant, there is provided a detonation sensor for each spark plug 15 suited to determine the ignition of the gases compressed inside a respective cylinder 2.

Each detonation sensor comprises a pressure measurer, which detects the maximum amplitude (MAPO—Maximum Amplitude Pressure Oscillation) of the intensity of the pressure waves generated in the cylinders 2 of the internal combustion engine 1. In particular, according to a preferred variant, number 16 generally indicates a control unit 16 consisting of a first electronic control unit, which is designed to detect the ionization currents to the electrodes of each one of the spark plugs 15 and to analyse the frequency content of said ionization currents. The control unit 16 is connected, via CAN, to an engine control unit, which applies the spark advance that is deemed to be necessary for each cylinder 2 based one the corresponding signal coming from the control unit 16.

The control unit 16 is designed to determine a raw detonation index $I_{raw}$ for each cylinder 2 for each combustion as a function of the signal coming from the respective detonation sensor. Therefore, the raw detonation index $I_{raw}$ is correlated with the maximum amplitude (MAPO—Maximum Amplitude Pressure Oscillation) of the intensity of the pressure waves generated in the respective cylinder 2 in the combustion being examined. After having calculated the raw detonation index $I_{raw}$ for each cylinder 2 and for each combustion, a detonation index I is calculated through the difference between the raw detonation index $I_{raw}$ and a reference value $I_{ref}$. Inside the control unit 16 there is stored a map, which provides the reference value $I_{ref}$ as a function of the engine point; the reference value $I_{ref}$ represents the maximum amplitude of the intensity of the pressure waves generated in the respective cylinder 2 for each combustion cycle in the absence of detonation events.

Figure 4:
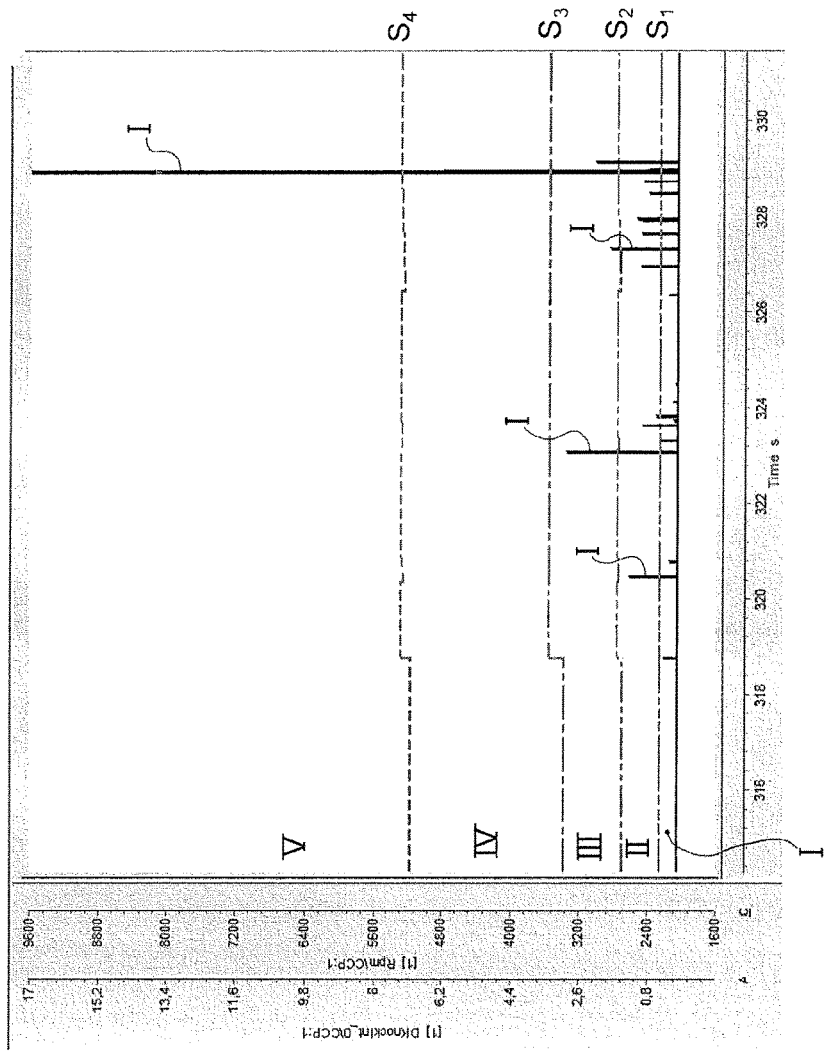
FIG. 4 shows, in a time/number of revolutions (rpm) plane, the intensity of detonation indexes.

Inside the control unit 16 there are stored a plurality of threshold values, which identify, in turn, a plurality of detonation intervals. In particular, according to a preferred embodiment shown in FIG. 4, inside the control unit 16 there are stored four threshold values indicated with $S_1$, $S_2$, $S_3$ and $S_4$, respectively, which identify, in turn, five detonation intervals indicated with I, II, III, IV and V, respectively. The four threshold values indicated with $S_1$, $S_2$, $S_3$ and $S_4$, respectively, according to FIG. 4, can be adjusted as a function of the number of revolutions (rpm) or of the load. Therefore, inside the control unit 16 there are stored the threshold values $S_1$, $S_2$, $S_3$, $S_4$ that define the five detonation intervals indicated with I, II, III, IV and V.

The detonation interval indicated with I comprises all the marginal detonation events characterized by a detonation index I below the threshold value $S_1$. The detonation interval indicated with II includes all the detonation events with a reduced intensity characterized by a detonation index I comprised between the threshold values indicated with $S_1$ and $S_2$. The detonation interval indicated with III includes all the detonation events with a medium intensity characterized by a detonation index I comprised between the threshold values indicated with $S_2$ and $S_3$. The detonation interval indicated with IV includes all the detonation events with a high intensity characterized by a detonation index I comprised between the threshold values indicated with $S_3$ and $S_4$. Finally, the detonation interval indicated with V comprises all the detonation events with a very high intensity characterized by a detonation index I exceeding the threshold value $S_4$.

Inside the control unit 16 there are stored a plurality of counters $COUNTER_i$, which, in use, are updated during the strategy for estimating the anti-knocking capacity of the fuel. In particular, inside the control unit 16 there are stored five counters $COUNTER_I$, $COUNTER_{II}$, $COUNTER_{III}$, $COUNTER_{IV}$ and $COUNTER_V$, each associated with a respective detonation interval indicated with I, II, III, IV and V. In use, each counter $COUNTER_I$, $COUNTER_{II}$, $COUNTER_{III}$, $COUNTER_{IV}$ and $COUNTER_V$ is increased every time the control unit 16 recognizes a combustion associated with a detonation index I comprised in the corresponding detonation interval indicated with I, II, III, IV and V. In other words, through the five counters $COUNTER_I$, $COUNTER_{II}$, $COUNTER_{III}$, $COUNTER_{IV}$ and $COUNTER_V$, the control unit keeps count of how many marginal detonation events take place, of how many detonation events with a reduced intensity take place, of how many detonation events with a medium intensity take place and of how many detonation events with a very high intensity take place. Finally, the control unit 16 is also designed to keep count of how many no-detonation events take place by means of a counter $COUNTER_{no\_det}$, which is increased every time the control unit recognizes a no-detonation combustion associated with a detonation index I that is basically equal to zero. We would also like to point out that the counter $COUNTER_{no\_det}$ is increased every tome the control unit 16 recognizes a no-detonation combustion exclusively in correspondence to the engine points (identified by the number of revolutions (rpm) and by the load) in which detonation events can actually take place; in other words, the control unit 16 is designed to ignore, thus not updating the counter $COUNTER_{no\_det}$, every time it recognizes a no-detonation combustion of the engine points (identified by the number of revolutions (rpm) and by the load) in which detonation events cannot take place.

In use, the control unit 16 is designed to recognize a refueling; after a refueling has been recognized, the control unit 16 activates the strategy for estimating the anti-knocking capacity of the new fuel introduced with the refueling, so as to adjust the spark advance operated to the anti-knocking capacity of the new fuel introduced with the refueling.

First of all, the control unit 16 checks whether the combustion being examined occurs in an engine point (identified by the number of revolutions (rpm) and by the load) in which detonation events can actually take place. In case the result of this first check is negative, namely if the combustion being examined occurs in an engine point in which detonation events cannot take place, the control unit 16 is designed to ignore the current combustion and wait for the following combustion cycle.

Then the detonation index I of the current combustion is calculated through the difference between the raw detonation index $I_{raw}$ (obtained, in turn, by processing the signal coming from the corresponding detonation sensor) and the reference value $I_{ref}$.

In case the result of the aforesaid first check is positive, namely if the current combustion occurs in an engine point in which detonation events can actually take place, the control unit 16, first of all, checks whether during the combustion a detonation phenomenon has taken place or not. In case this check has a negative result, namely if no detonation events have occurred, the counter $COUNTER_{no\_det}$ is increased and updated. In case this check has a positive result, namely if detonation events have occurred, the control unit 16 compares the detonation index I of the current combustion with the threshold value $S_4$. In case the detonation index I of the current combustion exceeds or is equal to the threshold value $S_4$, the counter $COUNTER_V$ is updated. In other words, the number of detonation events with a very high intensity comprised in the detonation interval indicated with V is increased. In case the detonation index I of the current combustion is below the threshold value $S_4$, the control unit 16 compares the detonation index I of the current combustion with the threshold value $S_3$. In case the detonation index I of the current combustion exceeds or is equal to the threshold value $S_3$, the counter $COUNTER_{IV}$ is updated. In other words, the number of detonation events with a high intensity comprised in the detonation interval indicated with IV is increased. In case the detonation index I of the current combustion is below the threshold value $S_3$, the control unit 16 compares the detonation index I of the current combustion with the threshold value $S_2$.

In case the detonation index I of the current combustion exceeds or is equal to the threshold value $S_2$, the counter $COUNTER_{III}$ is updated. In other words, the number of detonation events with a medium intensity comprised in the detonation interval indicated with III is increased. In case the detonation index I of the current combustion is below the threshold value $S_2$, the control unit 16 compares the detonation index I of the current combustion with the threshold value $S_1$.

In case the detonation index I of the current combustion exceeds or is equal to the threshold value $S_1$, the counter $COUNTER_{II}$ is updated. In other words, the number of detonation events with a low intensity comprised in the detonation interval indicated with II is increased. In case the detonation index I of the current combustion is below the threshold value $S_1$, the counter $COUNTER_I$ is updated. In other words, the number of detonation events with a marginal intensity comprised in the detonation interval indicated with I is increased.

In other words, the detonation index I of the current combustion is compared with the threshold values $S_1, S_2, S_3, S_4$ until one can determine the detonation interval to which the current combustion belongs. In case the combustion being examined takes place in an engine point in which detonation events can actually occur, the control unit 16 also establishes whether a detonation event has not taken place or whether a detonation event with a marginal, reduced, medium, high or very high intensity has taken place, updating the corresponding counter $COUNTER_I$, $COUNTER_{II}$, $COUNTER_{III}$, $COUNTER_{IV}$ and $COUNTER_V$.

Each one of the six counters $COUNTER_{no\_det}$, $COUNTER_I$, $COUNTER_{II}$, $COUNTER_{III}$, $COUNTER_{IV}$ and $COUNTER_V$ is associated with a corresponding threshold value $TV_{CNTno\_det}$, $TV_{CNTI}$, $TV_{CNTII}$, $TV_{CNTIII}$, $TV_{CNTIV}$ and $TV_{CNTV}$.

The control unit 16 checks the single combustion cycles until one of the six counters $COUNTER_{no\_det}$, $COUNTER_I$, $COUNTER_{II}$, $COUNTER_{III}$, $COUNTER_{IV}$ and $COUNTER_V$ reaches the corresponding threshold value $TV_{CNTno\_det}$, $TV_{CNTI}$, $TV_{CNTII}$, $TV_{CNTIII}$, $TV_{CNTIV}$ and $TV_{CNTV}$. By so doing, a cycle for calculating the strategy for estimating the anti-knocking capacity of the new fuel introduced with the refueling can be considered as concluded and all six counters $COUNTER_{no\_det}$, $COUNTER_I$, $COUNTER_{II}$, $COUNTER_{III}$, $COUNTER_{IV}$ and $COUNTER_V$ are zeroed.

Based on the counter $COUNTER_{no\_det}$, $COUNTER_I$, $COUNTER_{II}$, $COUNTER_{III}$, $COUNTER_{IV}$ and $COUNTER_V$ that has reached the corresponding threshold value $TV_{CNTno\_det}$, $TV_{CNTI}$, $TV_{CNTII}$, $TV_{CNTIII}$, $TV_{CNTIV}$ and $TV_{CNTV}$, the anti-knocking capacity of the fuel being used is updated or maintained.

In particular, if the counter $COUNTER_{no\_det}$ reaches the corresponding threshold value $TV_{CNTno\_det}$ this can mean that the fuel introduced with the refueling has the same anti-knocking capacity as the previously used fuel and the operated spark advance does not need to be adjusted to the new fuel introduced with the refueling. Alternatively, if the counter $COUNTER_{no\_det}$ reaches the corresponding threshold value $TV_{CNTno\_det}$ this can mean that the fuel introduced with the refueling is better than the previously used fuel; in this case, the anti-knocking capacity of the fuel being used in updated.

In the other cases, if any one of the counters $COUNTER_I$, $COUNTER_{II}$, $COUNTER_{III}$, $COUNTER_{IV}$ and $COUNTER_V$ has reached the corresponding threshold value $TV_{CNTI}$, $TV_{CNTII}$, $TV_{CNTIII}$, $TV_{CNTIV}$ and $TV_{CNTV}$, this means that the fuel introduced with the refueling has an anti-knocking capacity that is different from the anti-knocking capacity of the previously used fuel and, therefore, the operated spark advance needs to be adjusted to the anti-knocking capacity of the new fuel introduced with the refueling.

Furthermore, in a preliminary phase, a number of fuels were identified, in particular five fuels, based on their anti-knocking capacity. In particular, five fuel classes were identified, namely $RON_{98+}$ identifies fuels with a high anti-knocking capacity, $RON_{95}$ identifies fuels with a medium anti-knocking capacity, $RON_{91}$ identifies fuels with a low anti-knocking capacity, and $RON_{98/95}$ and $RON_{95/91}$ identify fuels with an intermediate anti-knocking capacity comprised between the aforesaid values.

Figures 5, 6:
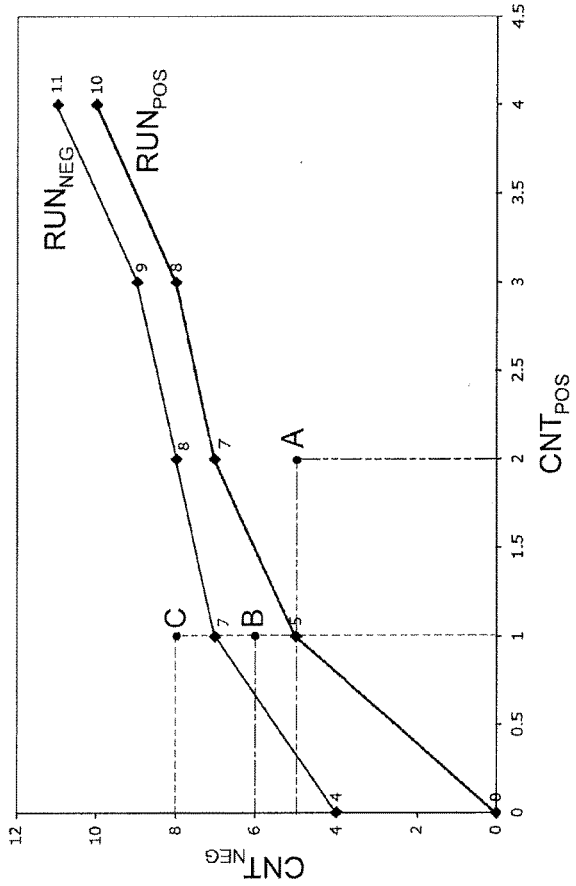
FIG. 5 is a map used to update the anti-knocking capacity of a fuel relative to a reference fuel after a refueling.
FIG. 6 is a diagram used to update the anti-knocking capacity of a fuel relative to a reference fuel during the normal operation of the internal combustion engine of FIG. 2.

Inside the control unit 16 there is stored a map shown in FIG. 5, which is consulted at the end of each cycle for calculating the strategy for estimating the anti-knocking capacity of the new fuel introduced with the refueling. First of all, one calculates the mean spark advance SA operated by the internal combustion engine 1 in the combustion cycles that caused the counter $COUNTER_{no\_det}$, $COUNTER_I$, $COUNTER_{II}$, $COUNTER_{III}$, $COUNTER_{IV}$ and $COUNTER_V$ to reach the corresponding threshold value $TV_{CNTno\_det}$, $TV_{CNTI}$, $TV_{CNTII}$, $TV_{CNTIII}$, $TV_{CNTIV}$ and $TV_{CNTV}$. Knowing which counter $COUNTER_{no\_det}$, $COUNTER_I$, $COUNTER_{II}$, $COUNTER_{III}$, $COUNTER_{IV}$ and $COUNTER_V$ has reached the corresponding threshold value $TV_{CNTno\_det}$, $TV_{CNTI}$, $TV_{CNTII}$, $TV_{CNTIII}$, $TV_{CNTIV}$ e $TV_{CNTV}$ and the mean spark advance SA operated by the internal combustion engine 1 in the combustion cycles that caused said counter $COUNTER_{no\_det}$, $COUNTER_I$, $COUNTER_{II}$, $COUNTER_{III}$, $COUNTER_{IV}$ and $COUNTER_V$ to reach the corresponding threshold value $TV_{CNTno\_det}$, $TV_{CNTI}$, $TV_{CNTII}$, $TV_{CNTIII}$, $TV_{CNTIV}$ and $TV_{CNTV}$, the map indicates the variation to be applied to the anti-knocking capacity (i.e. to the current reference fuel level).

For example, we can assume that the cycle for calculating the strategy for estimating the anti-knocking capacity of the new fuel introduced with the refueling has ended because the counter $COUNTER_{IV}$ has reached the corresponding threshold value $TV_{CNTIV}$ (equal to six detonation events recognized in the detonation interval IV) starting from a reference fuel with a mean anti-knocking capacity $RON_{95}$. The six detonation events recognized in the detonation interval IV took place in combustion cycles in which the spark advance SA operated by the internal combustion engine 1 assumed the following values:

| Detonation event | SA (°) |
| --- | --- |
| 1 | −3.50 |
| 2 | −2.25 |
| 3 | −5.25 |
| 4 | −0.75 |
| 5 | 0 |
| 6 | 0 |

The mean spark advance SA operated by the internal combustion engine 1 in the six combustion cycles that caused the counter $COUNTER_{IV}$ to reach the corresponding threshold value $TV_{CNTIV}$ is equal to −1.96°.

Consulting the map shown in FIG. 5, one can establish that, in case the counter $COUNTER_{IV}$ has reached the corresponding threshold value $TV_{CNTIV}$ operating a mean spark advance SA equal to −2° in the six combustion cycles characterized by detonation events, the variation to be applied to the anti-knocking capacity (i.e. relative to the reference fuel level) is equal to +1. The reference fuel is then updated to the fuel with a smaller anti-knocking capacity, namely with an intermediate anti-knocking capacity $RON_{91/95}$.

The cycle described above for calculating the strategy for estimating the anti-knocking capacity of the new fuel introduced with the refueling is repeated $n_1$ times, wherein $n_1$ is an adjustable value, which is determined in a set up phase of the control unit 16. Said $n_1$ reference fuels determined at the end of each calculation cycle are stored in a vector of the control unit 16 and, at the end of said $n_1$ calculation cycles, the strategy for estimating the anti-knocking capacity of the new fuel introduced with the refueling is considered as concluded.

The control unit 16 is designed to establish that the anti-knocking capacity of the new fuel introduced with the refueling is equal to the greatest anti-knocking capacity among those of the $n_2$ reference fuels determined at the end of the last $n_2$ calculation cycles stored in the vector; wherein $n_2$ is an adjustable value, which is determined in a set up phase of the control unit 16 and is preferably smaller than $n_1$.

Each one of the five fuels identified based on their anti-knocking capacity is associated with a map stored in the control unit 16, which, depending on the engine point, i.e. on the number of revolutions (rpm) and on the load), provides the variation of the spark advance to be applied. Therefore, in use, besides the variation of the spark advance deriving from the detonation control strategy (namely, the strategy used to avoid the occurrence of detonation phenomena), a further variation of the spark advance is applied, which is due to the anti-knocking capacity of the fuel being used. Hence, the strategy for estimating the anti-knocking capacity of the new fuel introduced with the refueling, involves correcting the spark advance to be operated as a function of the greatest anti-knocking capacity included in the second number $n_2$ of values of the anti-knocking capacity of the fuel introduced with the refueling.

The strategy described above for estimating the anti-knocking capacity of the new fuel introduced with the refueling can be also used, with some changes, during the normal operation of the internal combustion engine 1. In this case, as well, the calculation cycles are carried out exactly as described above, using the six counters $COUNTER_{no\_det}$, $COUNTER_I$, $COUNTER_{II}$, $COUNTER_{III}$, $COUNTER_{IV}$ and $COUNTER_V$ and the respective threshold values $TV_{CNTno\_Det}$, $TV_{CNTI}$, $TV_{CNTII}$, $TV_{CNTIII}$, $TV_{CNTIV}$ and $TV_{CNTV}$.

In the control unit 16 there are stored three variables indicated with $CNT_{POS}$, $CNT_{NULL}$ and $CNT_{NEG}$, respectively. At the end of each calculation cycle, one of the three variables $CNT_{POS}$, $CNT_{NULL}$ and $CNT_{NEG}$ is updated based on the variation to be applied to the anti-knocking capacity (relative to the reference fuel level) provided by the map shown in FIG. 5. In case the reference fuel needs to be updated to the fuel with a greater anti-knocking capacity, the variable $CNT_{POS}$ is increased; in case the reference fuel needs to be updated to the fuel with a smaller anti-knocking capacity, the variable $CNT_{NEG}$ is updated; and, finally, in case there is no need to update the reference fuel, the variable $CNT_{NULL}$ is increased.

The cycle for calculating the strategy for estimating the anti-knocking capacity of the fuel is repeated $n_3$ times, wherein $n_3$ is an adjustable value, which is determined in a set up phase of the control unit 16 and, for example, is equal to 10. At the end of each one of the ten calculation cycles, one of the three variables $CNT_{POS}$ $CNT_{NULL}$ and $CNT_{NEG}$ is updated.

Finally, two vectors are defined, which are indicated with $RUN_{POS}$ and $RUN_{NEG}$ (adjustable in a set up phase of the control unit 16) and define the maximum number of combustion cycles that are necessary to update the reference fuel to the fuel with a greater anti-knocking capacity and the minimum number of combustion cycles that are necessary to update the reference fuel to the fuel with a smaller anti-knocking capacity. The development of the two vectors $RUN_{POS}$ and $RUN_{NEG}$ is graphically represented by two broken lines in the plane $CNT_{POS}$-$CNT_{NEG}$ shown in FIG. 6.

If, at the end of the cycle for calculating the strategy for estimating the anti-knocking capacity of the fuel, the point defined by the variables $CNT_{POS}$-$CNT_{NEG}$ is located in the portion of the diagram of FIG. 6 subtended by the vector $RUN_{POS}$, the reference fuel is updated to the fuel with a smaller anti-knocking capacity. If, at the end of the cycle for calculating the strategy for estimating the anti-knocking capacity of the fuel, the point defined by the variables $CNT_{POS}$-$CNT_{NEG}$ is located in the portion of the diagram of FIG. 6 above the vector $RUN_{NEG}$, the reference fuel is updated to the fuel with a greater anti-knocking capacity. If, at the end of the cycle for calculating the strategy for estimating the anti-knocking capacity of the fuel, the point defined by the variables $CNT_{POS}$-$CNT_{NEG}$ is located in the portion of the diagram of FIG. 6 comprised between the vector $RUN_{POS}$ and the vector $RUN_{NEG}$, the reference fuel is not updated.

For example, at the end of said ten calculation cycles, the following cases can occur:

|  | A | B | C |
|---|---|---|---|
| $CNT_{POS}$ | 2 | 1 | 1 |
| $CNT_{NULL}$ | 3 | 3 | 1 |
| $CNT_{NEG}$ | 5 | 6 | 8 |

In case A indicated in the diagram of FIG. 6, the reference fuel is updated to the fuel with a smaller anti-knocking capacity; in case C indicated in the diagram of FIG. 6, the reference fuel is updated to the fuel with a greater anti-knocking capacity; whereas, in case B, which is also indicated in the diagram of FIG. 6, the reference fuel is not updated.

According to a variant, the internal combustion engine 1 is provided with eight cylinders 2 and with two control units 16, which are connected to one another via CAN and are each connected to four cylinders 2. Each one of the two control units 16 is designed to implement the strategy for recognizing the anti-knocking capacity of a fuel introduced after a refueling independently of one another. The anti-knocking capacity of the fuel introduced after a refueling is equal to the worst anti-knocking capacity between the ones determined in an independent manner by the two control units 16. For example, if a first control unit 16 recognizes a fuel with an anti-knocking capacity $RON_{95/91}$ and a second control unit 16 recognizes a fuel with an anti-knocking capacity $RON_{95}$, then the anti-knocking capacity of the fuel introduced after the refueling is established to be $RON_{95/91}$.

The method described above for detecting the anti-knocking capacity of a fuel in an internal combustion engine has many advantages. In particular, the strategy described above is simple and cheap to be implemented in a control unit 16, as it does not require any physical changes and use a small calculation capacity of the control unit 16 itself. Furthermore, the method described above allows you to effectively recognize the anti-knocking capacity of a fuel introduced after a refueling and to adjust the operated spark advance to said fuel without significant negative effects on the efficiency of the combustions (which is kept close to the maximum possible values with clear benefits for consumptions and pollution containment) and preventing the repetition of high-intensity detonation phenomena from causing damages to the components of the internal combustion engine 1.

The invention claimed is:

1. A method for detecting anti-knocking capacity of a fuel in an internal combustion engine provided with a number of cylinders, the method comprising:
   identifying a plurality of fuels as a function of their anti-knocking capacity;
   identifying a reference fuel among the plurality of fuels;
   an analysis step to analyze the single combustion cycles of the cylinders comprising the following sub-steps:
   determining a detonation index for each combustion; wherein the detonation index is calculated through the difference between a raw detonation index, which is correlated with the maximum amplitude of the intensity of the pressure waves generated in a cylinder during the combustion, and a reference value;
   comparing the detonation index with a number of threshold values, which define a number of detonation intervals; each one of said detonation intervals defines detonating events, which substantially have the same intensity; and
   increasing a first counter associated with the detonation interval in which the detonation index is included;
   repeating the analysis step to analyze the single combustion cycles of the cylinders until the moment in which any one of the first counters reaches a respective limit value;
   calculating the mean spark advance operated by the internal combustion engine in the single combustion cycles of the cylinders that have allowed said first counter to reach the respective limit value;
   determining a variation to be applied to the anti-knocking capacity of the reference fuel as a function both of the first counter that has reached the respective limit value and of the mean spark advance operated by the internal combustion engine in the single combustion cycles of the cylinders that have allowed said first counter to reach the respective limit value; and
   adjusting the spark advance operated by the internal combustion engine in accordance with the anti-knocking capability of the fuel;
   wherein, when a refueling takes place, the method comprises the further steps of:
   detecting that the refueling has occurred;
   zeroing each first counter;
   repeating a first number of analysis cycles, so as to determine a number of values of the anti-knocking capacity of the fuel introduced with the refueling, which is equal to said first number of analysis cycles;
   determining a correction of the spark advance to be operated as a function of a second number of values of the anti-knocking capacity of the fuel introduced with the refueling, wherein the second number of values represents a group of said first number of analysis cycles and, in particular, the last ones in time order; and
   zeroing each first counter after having determined the anti-knocking capacity of the fuel introduced with the refueling.

2. A method according to claim 1 and comprising the further step of ignoring the single combustion cycles of the cylinders that take place in correspondence to engine points determined by the number of revolutions per minute and by the load, in which no detonating events can occur.

3. A method according to claim 1 and comprising, during the normal operation of the internal combustion engine, the further step of increasing a respective one of three second counters, respectively, depending upon whether the variation to be applied to the anti-knocking capacity of the reference fuel is positive or null or negative.

4. An electronic control unit, which is designed to implement a method for detecting the anti-knocking capacity of a fuel in an internal combustion engine performed according to claim 1.

5. A method for detecting anti-knocking capacity of a fuel in an internal combustion engine provided with a number of cylinders, the method comprising:
   identifying a plurality of fuels as a function of their anti-knocking capacity;
   identifying a reference fuel among the plurality of fuels;
   analyzing the combustion cycles of the cylinders comprising the following sub-steps:
      determining a detonation index for each combustion; wherein the detonation index is calculated through the difference between a raw detonation index, which is correlated with the maximum amplitude of the intensity of the pressure waves generated in a cylinder during the combustion, and a reference value;
      comparing the detonation index with a number of threshold values, which define a number of detonation intervals; each one of said detonation intervals defines detonating events, which substantially have the same intensity; and
      increasing a first counter associated with the detonation interval in which the detonation index is included;
   repeating the analysis step to analyze the single combustion cycles of the cylinders until the moment in which any one of the first counters reaches a respective limit value;
   calculating the mean spark advance operated by the internal combustion engine in the single combustion cycles of the cylinders that have allowed said first counter to reach the respective limit value;
   determining a variation to be applied to the anti-knocking capacity of the reference fuel as a function both of the first counter that has reached the respective limit value and of the mean spark advance operated by the internal combustion engine in the single combustion cycles of the cylinders that have allowed said first counter to reach the respective limit value; and
   adjusting the spark advance operated by the internal combustion engine in accordance with the anti-knocking capability of the fuel;

further comprising the steps of:
   during the normal operation of the internal combustion engine, increasing a respective one of three second counters, respectively, depending upon whether the variation to be applied to the anti-knocking capacity of the reference fuel is positive or null or negative;
   repeating a third number of analysis cycles, so as to determine a number of variations to be applied to the anti-knocking capacity of the reference fuel, which is equal to the third number of analysis cycles and so as to update said three second counters for a number of times that is equal to the third number of analysis cycles;
   comparing said three second counters at the end of the third number of analysis cycles with two vectors, which respectively define the maximum number of analysis cycles that are necessary to update the reference fuel to the fuel with a greater anti-knocking capacity and the minimum number of analysis cycles that are necessary to update the reference fuel to the fuel with a smaller anti-knocking capacity; and
   determining the variation to be applied to the anti-knocking capacity of the reference fuel as a function of the comparison between said three second counters at the end of the third number of analysis cycles and the two vectors.

6. A method according to claim 5 and comprising the further steps of:
   detecting when a refueling takes place;
   zeroing each first counter;
   repeating a first number of analysis cycles, so as to determine a number of values of the anti-knocking capacity of the fuel introduced with the refueling, which is equal to said first number of analysis cycles; and
   determining a correction of the spark advance to be operated as a function of a second number of values of the anti-knocking capacity of the fuel introduced with the refueling; wherein the second number of values represents a group of said first number of analysis cycles and, in particular, the last ones in time order.

7. A method according to claim 6 and comprising the further step of determining the correction of the spark advance to be operated as a function of the greatest anti-knocking capacity included in the second number of values of the anti-knocking capacity of the fuel introduced with the refueling.

8. A method according to claim 6 and comprising the further step of zeroing each first counter after having determined each one of said first number of values of the anti-knocking capacity of the fuel introduced with the refueling.

* * * * *